United States Patent
Kondo et al.

(10) Patent No.: US 11,681,820 B2
(45) Date of Patent: Jun. 20, 2023

(54) COMPUTER SYSTEM AND DATA ACCESS CONTROL METHOD

(71) Applicant: Hitachi, Ltd., Tokyo (JP)

(72) Inventors: Nobukazu Kondo, Tokyo (JP); Keiko Tanigawa, Tokyo (JP); Kentaro Kakui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 287 days.

(21) Appl. No.: 17/020,891

(22) Filed: Sep. 15, 2020

(65) Prior Publication Data
US 2021/0232697 A1 Jul. 29, 2021

(30) Foreign Application Priority Data
Jan. 27, 2020 (JP) .............................. JP2020-10997

(51) Int. Cl.
| | | |
|---|---|---|
| G06F 21/00 | (2013.01) | |
| G06F 21/62 | (2013.01) | |
| G06F 21/60 | (2013.01) | |
| G06F 11/34 | (2006.01) | |
| G06F 16/176 | (2019.01) | |
| G06F 16/17 | (2019.01) | |
| G06F 21/31 | (2013.01) | |

(52) U.S. Cl.
CPC ...... *G06F 21/6218* (2013.01); *G06F 11/3409* (2013.01); *G06F 16/176* (2019.01); *G06F 16/1734* (2019.01); *G06F 21/31* (2013.01); *G06F 21/604* (2013.01)

(58) Field of Classification Search
CPC .... G06F 21/6218; G06F 21/31; G06F 21/604; G06F 16/176; G06F 16/1734; G06F 11/3409
See application file for complete search history.

(56) References Cited

U.S. PATENT DOCUMENTS

| | | | |
|---|---|---|---|
| 11,366,842 B1* | 6/2022 | Swaminathan | ........ G06N 5/022 |
| 2017/0123397 A1* | 5/2017 | Billi | ...................... G06Q 10/063 |
| 2019/0108747 A1* | 4/2019 | Stenning | .................... F16P 3/00 |
| 2020/0166388 A1 | 5/2020 | Naito | |

FOREIGN PATENT DOCUMENTS

JP 2019-32800 A 2/2019

\* cited by examiner

*Primary Examiner* — Joseph P Hirl
*Assistant Examiner* — Chi D Nguy
(74) *Attorney, Agent, or Firm* — Mattingly & Malur, PC (57) ABSTRACT

The computer system is connected to a DB that stores data acquired from a production system in which a plurality of machines operate, and includes a generation unit and a data search unit. The DB stores operation data and environment data. The generation unit generates, by analyzing schedule information including a production schedule of the plurality of products, first owner information for storing first access control data including an owner, the machines, and a first access period set based on operation time, and generates, based on the first owner information, second owner information for storing second access control data including the owner, a type of the environment data, and a second access period set based on the first access period. The data search unit controls accesses to the DB based on the first owner information and the second owner information.

8 Claims, 5 Drawing Sheets

| ⋮ | ⋮ | ⋮ | ⋮ | ... |
|---|---|---|---|---|
| SENSOR DATA | dp031z | 09:15 | 0.26 | ... |
| SENSOR DATA | dp031z | 09:15 | 0.26 | ... |
| SENSOR DATA | dp031a | 09:20 | 0.31 | ... |
| SENSOR DATA | dp031z | 09:30 | 0.28 | ... |
| SENSOR DATA | dp031a | 09:30 | 0.29 | ... |
| ⋮ | ⋮ | ⋮ | ⋮ | ... |

DATA CATALOG 300

CATALOG DATA ID : dp031z
STORAGE LOCATION : xxxxxxx
DATA ITEM : ABC
SOURCE : yyy
⋮

| 401 | 402 | 403 | 404 |
|---|---|---|---|
| ID | CATALOG DATA ID | OWNER | PERIOD |
| 1 | dp031z | A | 10:00-10:25 |
| 2 | dp031z | B | 10:35-10:55 |
| ⋮ | ⋮ | ⋮ | ⋮ |

| 501 | 502 | 503 | 504 |
|---|---|---|---|
| ID | CATALOG DATA ID | OWNER | PERIOD |
| 1 | eT01 | A | 10:00-10:25 |
| 2 | eT01 | B | 10:35-10:55 |
| ⋮ | ⋮ | ⋮ | ⋮ |

FIG. 9

COMPUTER SYSTEM AND DATA ACCESS CONTROL METHOD

CLAIM OF PRIORITY

The present application claims priority from Japanese patent application JP 2020-10997 filed on Jan. 27, 2020, the content of which is hereby incorporated by reference into this application.

BACKGROUND OF THE INVENTION

1. Field of the Invention

The present invention relates to access control for data that is acquired using IoT.

2. Description of the Related Art

In a factory for producing a product, a mixed flow production method has been adopted in order to improve productivity. The method is a method of producing a large amount of products having similar production processes using the same production line.

Along with progresses of Internet of Things (IoT), efforts have been widely performed to collect various types of data from sensors provided in the factory and utilize the data to improve productivity.

The collected data is accumulated in a data lake because the collected data includes various types of data such as structured data and unstructured data. It is difficult to grasp contents, whereabouts, and the like of the data in the data accumulated in the data lake. Therefore, there is a problem that the accumulated data cannot be used, analyzed, or the like as it is.

In order to solve the problem, maintenance of a data catalog for managing the contents, whereabouts, and the like of the data has progressed. As a method of managing the data using the data catalog, a technique described in JP-A-2019-032800 (PTL 1) is known.

PTL 1 describes that, "a sensor management unit includes a sensing data acquisition unit 111 that acquires sensing data obtained by observing a target by a sensor 101, a metadata generation unit 112 that generates dynamic metadata indicating attributes that are related to usage modes of the sensor 101 that can be dynamically changed over time and are attributes of the sensor 101 at time points when the sensing data was obtained, and a metadata management unit 114 that manages the generated dynamic metadata in association with the sensing data."

Using the data catalog, data necessary for analysis and the like can be accessed. However, in a factory in which the mixed flow production method is adopted, an orderer may handle different products. Therefore, there is a need for a mechanism that restricts access to data relating to production of products by third parties unrelated to the orderer.

SUMMARY OF THE INVENTION

The invention provides a system and method for achieving appropriate access control for data acquired from a production system adopting a mixed flow production method.

A representative example of the invention disclosed in the present application is as follows. That is, a computer system including at least one computer connected to a database that stores data acquired from a sensor installed in a production system in which a plurality of machines operate according to schedule information, in which, in the production system, a plurality of products having different owners who are orderers are produced, the at least one computer includes a generation unit that generates information for controlling access to data stored in the database, and a data search unit that searches for data stored in the database, the database stores operation data managed in association with identification information of the machines, and environment data which is data relating to an environment of the production system, the generation unit acquires the schedule information including a production schedule of the plurality of products, generates, by analyzing the schedule information, first owner information for storing first access control data including identification information of the owner, identification information of the machines, and a first access period set based on operation time during which production operation of the products is performed in the machines, and generates, based on the first owner information, second owner information for storing second access control data including identification information of the owner included in the first access control data, a type of the environment data, and a second access period set based on the first access period included in the first access control data, and the data search unit controls accesses to the operation data and the environment data based on the first owner information and the second owner information.

According to the invention, appropriate access control for data acquired from the production system adopting the mixed flow production method can be achieved. Problems, configurations and effects other than those described above will be clarified by description of following embodiments.

DESCRIPTION OF THE PREFERRED EMBODIMENTS

Embodiments of the invention will be described below with reference to drawings. However, the invention is not limited to description contents in the embodiments described below. Those skilled in the art could have easily understood that specific configurations according to the invention can be changed without departing from a spirit or a scope of the invention.

In configurations of the invention described below, the same or similar configurations or functions are denoted by same reference numerals, and a repeated description thereof is omitted.

In the present specification, expressions such as "first", "second", and "third" are used to identify constituent components, and do not necessarily limit the number or order.

Positions, sizes, shapes, ranges, and the like of the components shown in the drawings may not represent actual positions, sizes, shapes, ranges, and the like in order to facilitate understanding of the invention. Therefore, the invention is not limited to the positions, the sizes, the shapes, the ranges, and the like that are disclosed in the drawings and the like.

First Embodiment

Figure 1:
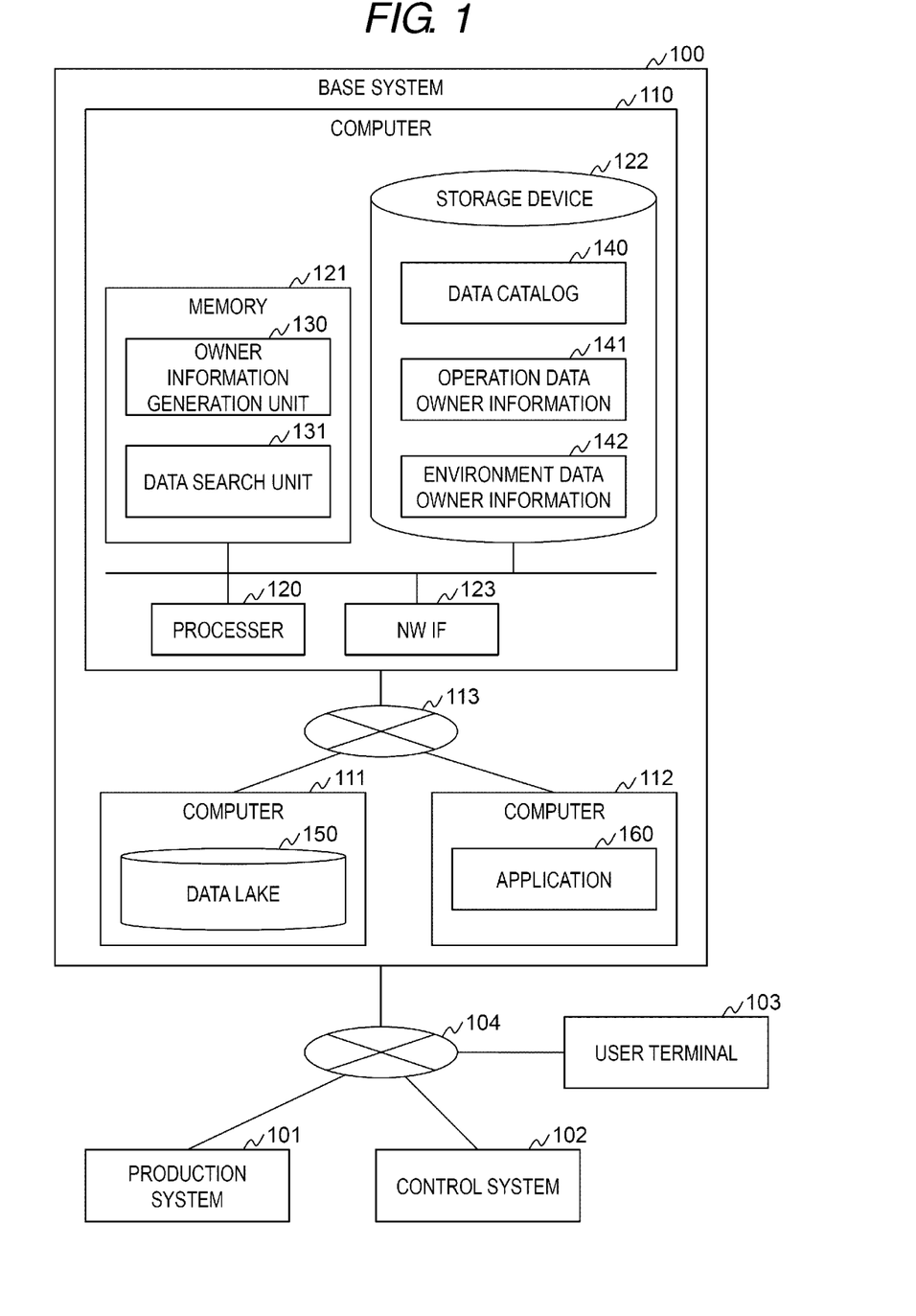
FIG. 1 is a diagram showing a configuration example of a computer system according to a first embodiment.

FIG. 1 is a diagram showing a configuration example of a computer system according to a first embodiment.

The computer system includes a base system 100, a production system 101, a control system 102, and a user terminal 103. The base system 100, the production system 101, the control system 102, and the user terminal 103 are connected to one another via a network 104. The network 104 is, for example, a wide area network (WAN), a local area network (LAN), or the like. A connection method of the network 104 may be either wired or wireless.

The number of the production systems 101, the control systems 102, and the user terminals 103 that are provided in the computer system may be two or more.

The production system 101 is a system that produces products. The production system 101 includes a plurality of machines that perform a product production operation and a plurality of sensors that measure various values of the production system 101. In the production system 101, products having different types are produced in a mixed flow production method. The plurality of sensors includes a sensor that acquires a value indicating a state of a machine and the like, and a sensor that acquires a value related to an environment of the production system 101.

In the following description, data including a value showing a state of a machine and the like, that is, data managed in association with a machine is referred to as operation data, and data including a value related to the environment of the production system 101 is referred to as environment data. When not distinguished, the operation data and the environment data are referred to as collected data.

The production system 101 may include an edge device that aggregates and processes the collected data. The collected data may be raw data that has not been processed or may be data obtained by processing raw data.

The control system 102 is a system that controls the production system 101. The control system 102 is, for example, a manufacturing execution system (MES). The control system 102 manages an operation process of a product, assists an operator, and the like. The control system 102 has a function of generating and managing schedule information based on a production plan. For each machine, schedule data including a product to be operated, an orderer (owner) of the product, and a production schedule of the product is stored in the schedule information. The production schedule includes operation time, an operation procedure, an operation content, and the like.

The user terminal 103 is a terminal that acquires the collected data. The user terminal 103 includes a processor, a memory, a network interface, an input device, and an output device (not shown). The input device is a keyboard, a mouse, a touch panel, and the like, and the output device is a display, a printer, and the like.

The base system 100 is a system that acquires the collected data from the production system 101 and manages the collected data. The base system 100 includes a plurality of computers 110, 111, and 112. The computers 110, 111, and 112 are connected to one another via a network 113. The network 113 is, for example, a LAN. A connection method of the network 113 may be either wired or wireless.

The computer 111 is a computer that manages the collected data. In the first embodiment, the acquired collected data is stored in a data lake 150. A data structure of the data lake 150 will be described with reference to FIG. 2. The invention is not limited to a method of managing the acquired collected data.

The computer 112 is a computer that provides the collected data stored in the data lake 150, analyzes the collected data, and the like. On the computer 112, an application 160 for providing the collected data and analyzing the collected data is operated. A plurality of applications 160 may be operated on the computer 112.

The computer 110 is a computer that controls access to the collected data stored in the data lake 150. The computer 110 includes a processor 120, a memory 121, a storage device 122, and a network interface 123. These hardwares are connected to one another via an internal bus. The computer 110 may include an input device and an output device.

The hardware configurations of the computers 111 and 112 are the same as those of the computer 110.

The processor 120 executes a program stored in the memory 121. The processor 120 operates as a functional unit (a module) that implements a specific function by executing processing according to the program. In the following description, when the processing is described using the function unit as a subject, it is indicated that the processor 120 executes the program for implementing the module.

The memory 121 stores a program to be executed by the processor 120 and data used by the program. The memory 121 includes a work area temporarily used by the program. The program stored in the memory 121 will be described later.

The storage device 122 is a hard disk drive (HDD), a solid state drive (SSD), or the like, and stores data permanently. The data stored in the storage device 122 will be described later.

The program and the data that are stored in the memory 121 may be stored in the storage device 122. In this case, the processor 120 reads out the program and the data from the storage device 122 and loads the program and the data into the memory 121.

The storage device 122 stores a data catalog 140, operation data owner information 141, and environment data owner information 142.

The data catalog 140 is a catalog for managing contents, whereabouts, and the like of the collected data. Here, the contents of the collected data indicate a type, a meaning and the like of a data item, and the whereabouts of the collected data indicates a storage location of the collected data. A data structure of the data catalog 140 will be described with reference to FIG. 3.

The operation data owner information 141 is information for performing access control of the operation data stored in the data lake 150. A data structure of the operation data owner information 141 will be described in detail with reference to FIG. 4.

The environment data owner information 142 is information for performing access control of environment data stored in the data lake 150. A data structure of the operation data owner information 141 will be described in detail with reference to FIG. 5.

The memory 121 stores a program for implementing owner information generation unit 130 and a data search unit 131.

The owner information generation unit 130 generates the operation data owner information 141 and the environment data owner information 142.

The data search unit 131 searches the collected data stored in the data lake 150 using the data catalog 140, the operation data owner information 141, and the environment data owner information 142.

For each functional unit provided in the computer 110, a plurality of functional units may be combined into one functional unit, or a single functional unit may be divided into a plurality of functional units for respective functions.

Figure 2:
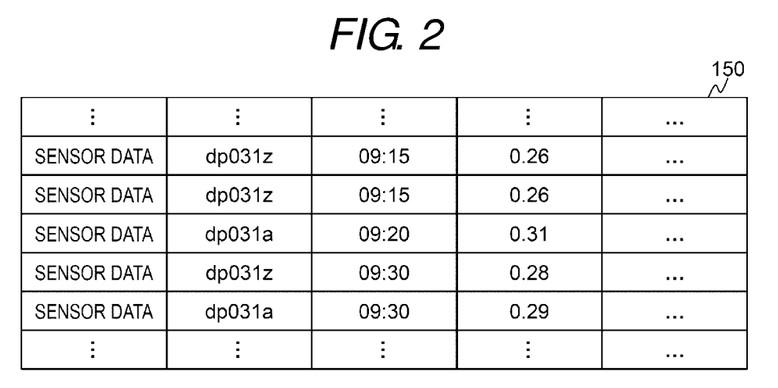
FIG. 2 is a diagram showing an example of a data structure of a data lake according to the first embodiment.

FIG. 2 is a diagram showing an example of the data structure of the data lake 150 according to the first embodiment.

The data lake 150 stores an entry including a plurality of fields. A name of the machine which is an acquisition source of the operation data, a sensor name, a time stamp, a type (pressure, speed, etc.) of a measurement value, the measurement value, and the like are stored in a field of the entry corresponding to the operation data. A type (temperature, humidity, weather, etc.) of the environment data, the sensor name, the time stamp, the measurement value, and the like are stored in a field of the entry corresponding to the environment data.

The invention is not limited to the values stored in the field. The number of fields included in the entry is not limited.

Figure 3:
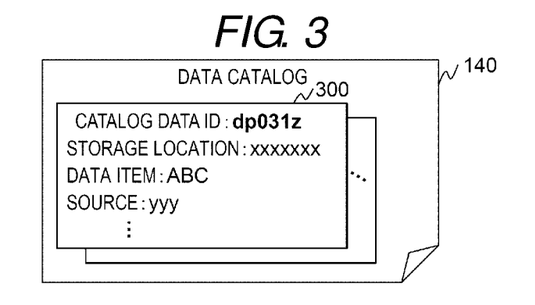
FIG. 3 is a diagram showing an example of a data structure of a data catalog according to the first embodiment.

FIG. 3 is a diagram showing the example of the data structure of the data catalog 140 according to the first embodiment.

The data catalog 140, for example, the structure information of the collected data indicating the contents and whereabouts of the collected data (meta data) which is input from the user Terminal 103 is generated by converting the data format such as XML.

The data catalog 140 stores a plurality of catalog data 300. It is assumed that the catalog data 300 is data in the XML format.

The catalog data 300 includes a catalog data ID, a storage location, a data item, a source, and the like. Here, the catalog data ID is identification information of the catalog data 300. The storage location is a storage location of the collected data. The data item is an item constituting the collected data. The source is a value indicating a sensor from which data is acquired.

The value stored in the catalog data 300 shown in FIG. 3 is an example, and the invention is not limited thereto. For example, the catalog data 300 includes a measurement target and the like. The measurement target of the operation data is the machine, and the measurement target of the environment data is the temperature, the humidity, the weather, and the like that are to be measured. The catalog data 300 may be data in a table format.

Figure 4:
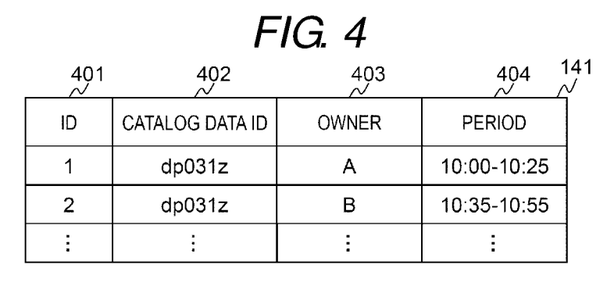
FIG. 4 is a diagram showing an example of a data structure of operation data owner information according to the first embodiment.

FIG. 4 is a diagram showing an example of the data structure of the operation data owner information 141 according to the first embodiment.

The operation data owner information 141 stores an entry including an ID 401, a catalog data ID 402, an owner 403, and a period 404.

The ID 401 is a field for storing identification information for identifying the entry. The catalog data ID 402 is a field for storing identification information (a catalog data ID) of the catalog data 300 of the operation data. The owner 403 is a field for storing identification information of a user who can access the operation data. In the present embodiment, identification information of a company or the like that orders production of products is stored. The period 404 is a field for storing a period for specifying accessible operation data among operation data groups managed in the catalog data 300. Specifically, a range of the time stamp is stored.

Figure 5:
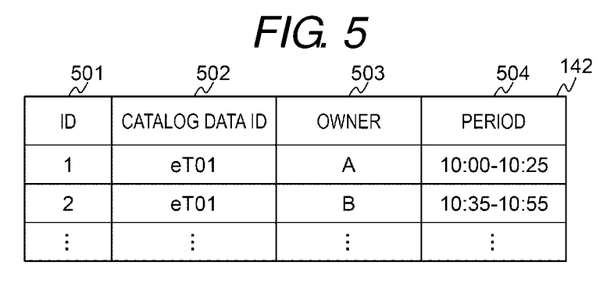
FIG. 5 is a diagram showing an example of a data structure of environment data owner information according to the first embodiment.

FIG. 5 is a diagram showing an example of the data structure of the environment data owner information 142 according to the first embodiment.

The environment data owner information 142 stores an entry including an ID 501, a catalog data ID 502, an owner 503, and a period 504.

The ID 501 is a field for storing identification information for identifying the entry. The catalog data ID 502 is a field for storing identification information (a catalog data ID) of the catalog data 300 of the environment data. The owner 503 is a field for storing identification information of a user who can access the environment data. In the present embodiment, identification information of a company or the like that orders production of products is stored. The period 504 is a field for storing a period for specifying accessible environment data among environment data groups managed in the catalog data 300. Specifically, a range of the time stamp is stored.

Figure 6:
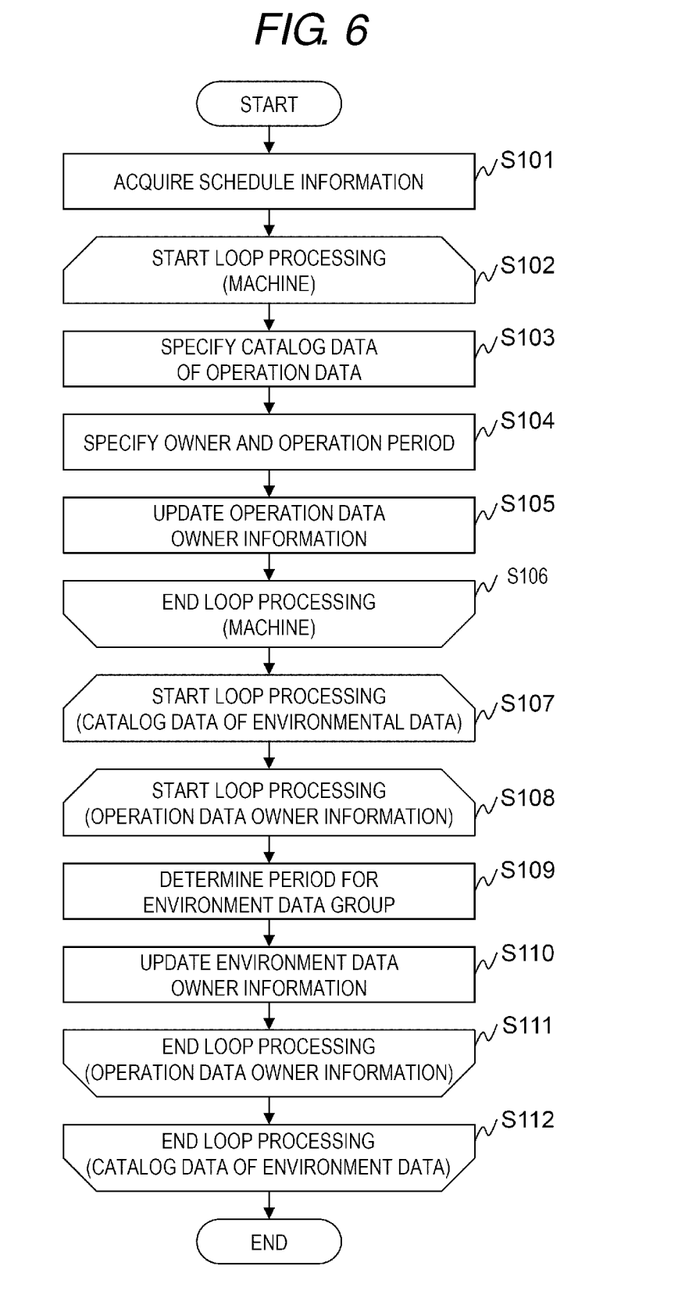
FIG. 6 is a flowchart showing an example of owner information generation processing executed by an owner information generation unit according to the first embodiment.

FIG. 6 is a flowchart showing an example of owner information generation processing executed by the owner information generation unit 130 according to the first embodiment.

The owner information generation unit 130 executes the following processing when an execution instruction is accepted, or periodically.

The owner information generation unit 130 acquires schedule information from the control system 102 (step S101).

Next, the owner information generation unit 130 starts loop processing of the machine (step S102).

Specifically, the owner information generation unit 130 acquires the schedule data of one machine from the schedule information.

Next, the owner information generation unit 130 specifies the catalog data 300 that manages the operation data of the selected machine with reference to the data catalog 140 (step S103).

Specifically, the owner information generation unit 130 searches the catalog data 300 including the value related to the selected machine. The value related to the machine is, for example, identification information of the machine and identification information of a sensor that measures the machine.

Next, the owner information generation unit 130 generates a set of owner and operation time for each product handled by the machine based on the schedule data (step S104).

Next, the owner information generation unit 130 updates the operation data owner information 141 (step S105).

Specifically, the owner information generation unit 130 adds the same number of entries as the generated set of the owner and the operation time to the operation data owner information 141, and sets identification information in IDs 401 of the added entries. The owner information generation unit 130 sets the identification information of the selected catalog data 300 in the catalog data IDs 402 of all the added entries. The owner information generation unit 130 sets the generated set of the owner and the operation time in the owner 403 and the period 404 of each added entry.

Next, the owner information generation unit 130 determines whether the processing for all machines has been completed (step S106).

When the processing for all machines has not been completed, the owner information generation unit 130 returns to step S102 and executes the same processing.

When the processing for all machines has been completed, the owner information generation unit 130 ends generation processing of the operation data owner information 141, and starts generation processing of the environment data owner information 142.

First, the owner information generation unit 130 starts loop processing of the catalog data 300 of the environment data (step S107).

Specifically, the owner information generation unit 130 specifies the catalog data 300 of the environment data based on the source or the like, and selects one catalog data 300 from the catalog data 300 of the specified environment data. That is, a type of the environment data is selected.

Next, the owner information generation unit 130 starts loop processing of the operation data owner information 141 (step S108).

Specifically, the owner information generation unit 130 selects one entry from the operation data owner information 141.

Next, the owner information generation unit 130 determines a period for the environment data managed in the catalog data 300 selected in step S107 based on the entry selected from the operation data owner information 141 (step S109).

Specifically, the owner information generation unit 130 determines the period 404 of the selected entry as the period for the environment data managed in the selected catalog data 300.

In consideration of the switching of the product and the delay of the operation, the owner information generation unit 130 may set a prohibition period in a part of the operation time. For example, it is considered that, 5 minutes after a start time of the operation time and 5 minutes before an end time of the operation time may be set as the prohibition period. In this case, the owner information generation unit 130 determines a period excluding the prohibition period from the operation time as the period of the catalog data 300. By providing the prohibition period, access to data by a third party who is not related to the owner can be more appropriately restricted. That is, inadvertent leakage of information can be prevented.

A method of setting the prohibition period based on a predefined policy is considered.

Next, the owner information generation unit 130 updates the environment data owner information 142 (step S110).

Specifically, the owner information generation unit 130 adds one entry to the environment data owner information 142, and sets the identification information in the ID 501 of the added entry. The owner information generation unit 130 sets the identification information of the selected catalog data 300 in the catalog data ID 502 of the added entry. The owner information generation unit 130 sets the identification information of the owner included in the entry selected from the operation data owner information 141 to the owner 403 of the added entry, and sets the period determined in the period 404.

Next, the owner information generation unit 130 determines whether the processing for all entries of the operation data owner information 141 has been completed (step S111).

When the processing for all entries of the operation data owner information 141 has not been completed, the owner information generation unit 130 returns to step S108 and executes the same processing.

When the processing for all entries of the operation data owner information 141 has been completed, the owner information generation unit 130 determines whether the processing for catalog data 300 of all specified environment data has been completed (step S112).

When the processing for catalog data 300 of all specified environment data has not been completed, the owner information generation unit 130 returns to step S107 and executes the same processing.

When the processing for catalog data 300 of all specified environment data has been completed, the owner information generation unit 130 ends the owner information generation processing.

A generation method of the operation data owner information 141 described with reference to FIG. 6 is an example, and the invention is not limited thereto. A generation method using the schedule information may be used.

A generation method of the environment data owner information 142 described with reference to FIG. 6 is an example, and the invention is not limited thereto. A generation method using the operation data owner information 141 may be used.

Figure 7A:
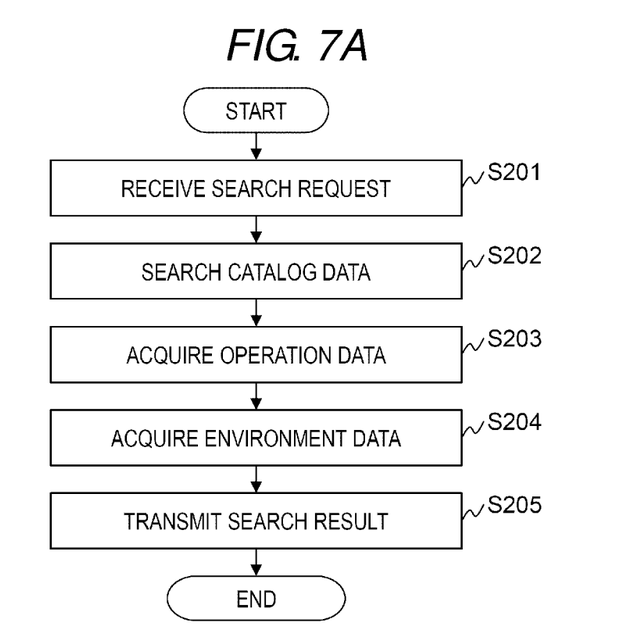
FIG. 7A is a flowchart showing an example of data search processing executed by a data search unit according to the first embodiment.
Figure 7B:
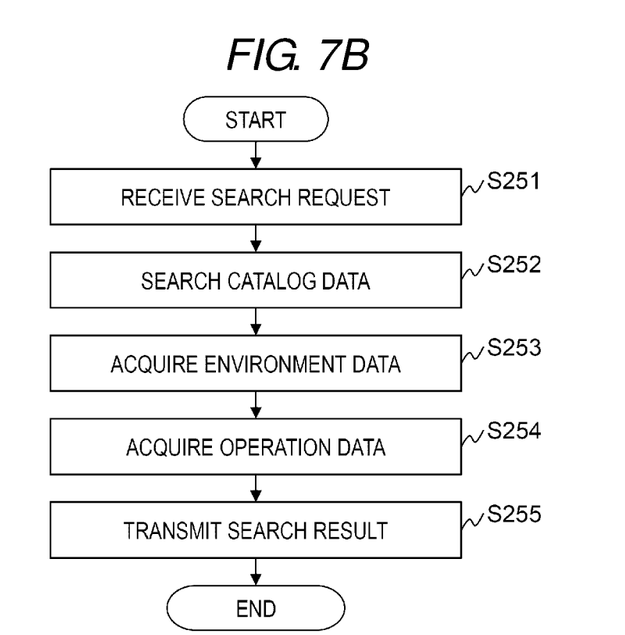
FIG. 7B is a flowchart showing an example of the data search processing executed by the data search unit according to the first embodiment.
Figure 8:
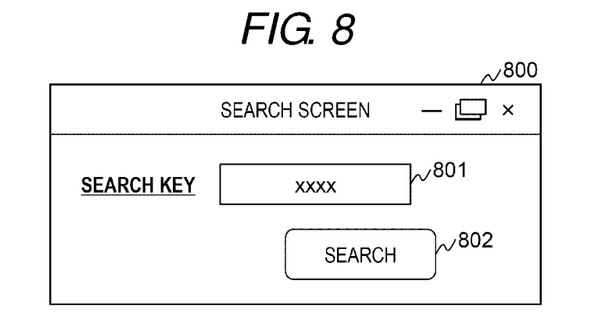
FIG. 8 is a diagram showing an example of a search screen presented by a computer according to the first embodiment.

FIG. 7A and FIG. 7B are flowcharts showing an example of the data search processing executed by the data search unit 131 according to the first embodiment. FIG. 8 is a diagram showing an example of a search screen presented by the computer 110 according to the first embodiment.

FIG. 7A shows search processing when a search request including a search key related to a product is accepted.

The data search unit 131 presents a login screen and executes login processing. In the login processing, identification information of a searcher is acquired. When the login processing is successful, the data search unit 131 presents a search screen 800 shown in FIG. 8 to the user terminal 103 or the like by executing the login processing. The search screen 800 includes a search key input field 801 and a search button 802.

The search key input field 801 is a field for inputting a character string, a numerical value, and the like that are used as a search key. Since the search using the data catalog 140 is a target in the present embodiment, a value stored in the data catalog 140 is input to the search key input field 801. For example, the name of the product is input to the search key input field 801.

The search button 802 is an operation button for instructing the search. When the user operates the search button 802, the user terminal 103 transmits the identification information of the user and the search request including the value in the search key input field 801 to the computer 110.

When the computer 110 receives a search request including identification information of a machine to be searched as a search key (step S201), the computer 110 calls the data search unit 131.

The data search unit 131 searches the catalog data 300 including identification information of machines included in the search request (step S202).

Next, based on the catalog data 300 and the operation data owner information 141, the data search unit 131 acquires the operation data from the data lake 150 (step S203). Specifically, the following processing is executed.

(S203-1) The data search unit 131 searches an entry whose catalog data ID 402 matches the identification information of the searched catalog data 300 and whose owner 403 matches the identification information of the searcher with reference to the operation data owner information 141. At this time, the data search unit 131 stores the value of the period 404 of the searched entry as a first reference period in the work area.

(S203-2) The data search unit 131 accesses the operation data stored in the data lake 150 based on the searched catalog data 300, and searches the operation data whose time stamp is included in the first reference period.

(S203-3) The data search unit 131 acquires the operation data searched from the data lake 150.

The above is the description of the processing in step S203.

Next, based on the environment data owner information 142, the data search unit 131 acquires environment data from the data lake 150 (step S204). Specifically, the following processing is executed.

(S204-1) The data search unit 131 searches an entry whose owner 503 matches the identification information of the searcher with reference to the environment data owner information 142. At this time, the data search unit 131 stores the values of the catalog data ID 502 and the period 504 of the searched entry as first reference identification information and a second reference period in the work area.

(S204-2) The data search unit 131 accesses the environment data stored in the data lake 150 based on the catalog data 300 corresponding to the first reference identification information, and searches environment data whose time stamp is included in the second reference period.

(S204-3) The data search unit 131 acquires the environment data searched from the data lake 150.

When a plurality of entries are searched in (S204-1), the data search unit 131 executes processing in (S204-2) and (S204-3) for each entry.

The above is the description of the processing in step S204.

Next, the data search unit 131 transmits a search result to the user terminal 103 (step S205), and ends the search processing.

The processing in steps S203 and S204 may be interchanged. The same processing is executed when the collected data to be used for the analysis is acquired.

In FIG. 7B, search processing when a search request including the type of environment data as a search key is accepted will be described.

The data search unit 131 presents a login screen and executes login processing. In the login processing, identification information of the searcher is acquired. When the login processing is successful, the data search unit 131 presents the search screen 800 shown in FIG. 8 to the user terminal 103 or the like by executing the login processing.

When the computer 110 receives the search request including the type of the environment data to be searched as the search key (step S251), the computer 110 calls the data search unit 131.

The data search unit 131 searches the catalog data 300 including the type of environment data included in the search request (step S252).

Next, based on the catalog data 300 and the environment data owner information 142, the data search unit 131 acquires the environment data from the data lake 150 (step S253). Specifically, the following processing is executed.

(S253-1) The data search unit 131 searches an entry whose catalog data ID 502 matches the identification information of the searched catalog data 300 and whose owner 503 matches the identification information of the searcher with reference to the environment data owner information 142. At this time, the data search unit 131 stores the value of the period 504 of the searched entry as a third reference period in the work area.

(S253-2) The data search unit 131 accesses the environment data stored in the data lake 150 based on the searched catalog data 300, and searches the environment data whose time stamp is included in the third reference period.

(S253-3) The data search unit 131 acquires the environment data searched from the data lake 150.

The above is the description of the processing in step S253.

Next, based on the operation data owner information 141, the data search unit 131 acquires the operation data from the data lake 150 (step S254). Specifically, the following processing is executed.

(S254-1) The data search unit 131 searches an entry whose owner 403 matches the identification information of the searcher with reference to the operation data owner information 141. At this time, the data search unit 131 stores the values of the catalog data ID 402 and the period 404 of the searched entry as second reference identification information and a fourth reference period in the work area.

(S254-2) The data search unit 131 accesses the operation data stored in the data lake 150 based on the catalog data 300 corresponding to the second reference identification information, and searches operation data whose time stamp is included in the fourth reference period.

(S254-3) The data search unit 131 acquires the operation data searched from the data lake 150.

When a plurality of entries are searched in (S254-1), the data search unit 131 executes processing in (S254-2) and (S254-3) for each entry.

The above is the description of the processing in step S254.

Next, the data search unit 131 transmits a search result to the user terminal 103 (step S255), and ends the search processing.

The processing in steps S253 and S254 may be interchanged. The same processing is executed when the collected data to be used for the analysis is acquired.

The base system 100 according to the first embodiment can automatically generate the operation data owner information 141 for executing access control on the operation data acquired from the production system 101 adopting the mixed flow production method. The base system 100 can automatically generate the environment data owner information 142 for executing access control on the environment data whose association with the machine is not executed from the operation data owner information 141.

When the base system 100 accepts the search request, the base system 100 can, based on the data catalog 140 and the operation data owner information 141, acquire accessible operation data which satisfy conditions included in the search request from the data lake 150. The base system 100 can, based on the data catalog 140 and the environment data owner information 142, acquire the environment data corresponding to the searched operation data from the data lake 150.

The invention according to the first embodiment is also applicable to a system in which the data catalog 140 is not present. In this case, instead of the catalog data ID 402, the operation data owner information 141 may be provided with a field for identifying operation data for a machine unit which is a machine or the like. Instead of the catalog data ID 502, the environment data owner information 142 may be provided with a field for identifying environment data for a type unit which is a type of the environment data or the like.

Second Embodiment

In a second embodiment, the owner information generation unit 130 updates owner information in accordance with an actual operation result of the production system 101. Hereinafter, the second embodiment will be described focusing on differences from the first embodiment.

A configuration of a computer system according to the second embodiment is the same as that according to the first embodiment. The configuration of the base system 100 according to the second embodiment is the same as that according to the first embodiment. Functions and information held by the computer 110 according to the second embodiment are the same as those according to the first embodiment.

Figure 9:
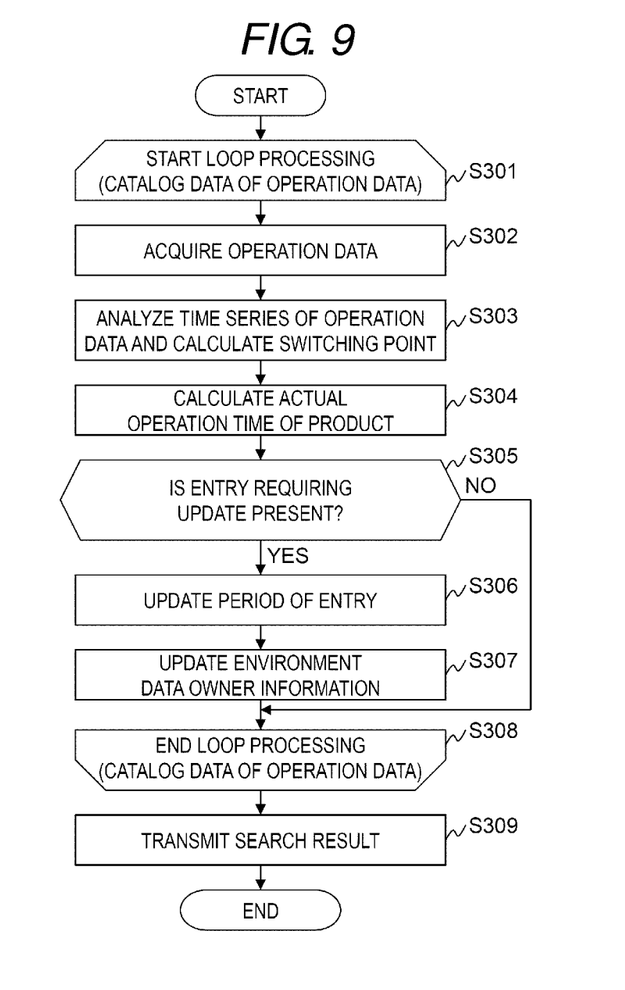
FIG. 9 is a flowchart showing an example of owner information update processing executed by the owner information generation unit according to the first embodiment.

In the second embodiment, the owner information generation unit 130 updates the operation data owner information 141 and the environment data owner information 142 in accordance with the actual operation result of the production system 101. FIG. 9 is a flowchart showing an example of the owner information update processing executed by the owner information generation unit 130 according to the first embodiment.

The owner information generation unit 130 executes the following processing when an execution instruction is accepted, or periodically.

The owner information generation unit 130 starts the loop processing of the data catalog 140 (step S301).

Specifically, the owner information generation unit 130 selects one piece of the catalog data 300 of the operation data from the data catalog 140. That is, the machine for which operation data is to be acquired is selected.

Next, the owner information generation unit 130 acquires operation data from the data lake 150 based on the catalog data 300 (step S302).

Next, the owner information generation unit 130 analyzes time series of the operation data, and thereby calculates a switching point indicating a time at which a product handled by the machine is switched (step S303).

For example, the owner information generation unit 130 calculates a time at which a changing rate of the measurement value included in the operation data is larger than a threshold as the switching point. The owner information generation unit 130 may present the time series of the operation data to the user and accept the input of the switching point from the user.

Next, the owner information generation unit 130 calculates actual operation time of each product for which the machine has performed the production operation based on the switching point (step S304). At this time, the owner information generation unit 130 generates a set of products and actual operation time.

Next, the owner information generation unit 130 determines whether an entry requiring update of the period is present in the entry related to the selected catalog data 300 of the operation data owner information 141 (step S305). Specifically, the following processing is executed.

(S305-1) The owner information generation unit 130 selects one set of products and actual operation time.

(S305-2) The owner information generation unit 130 specifies the owner of the products in the selected set based on the selected data catalog 140.

(S305-3) The owner information generation unit 130 searches an entry whose catalog data ID 402 matches the identification information of the selected catalog data 300 and whose owner 403 matches the identification information of a specified owner with reference to the operation data owner information 141.

(S305-4) The owner information generation unit 130 determines whether there is a deviation between the value of the period 404 of the searched entry and the actual operation time.

A criterion for determining a presence or absence of the deviation can be set freely. For example, the owner information generation unit 130 determines that the deviation is present when the value of the period 404 does not completely match the actual operation time. The owner information generation unit 130 determines that the deviation is present when a sum of a difference between the start time of the period 404 and the start time of the actual operation time and a difference between the end time of the period 404 and the end time of the actual operation time is larger than a threshold.

(S305-5) When the deviation is not present, the owner information generation unit 130 proceeds to (S305-6). When the deviation is present, the owner information generation unit 130 registers an entry including the ID 401 and the period 404 of the searched entry and the actual operation time in the list. Thereafter, the owner information generation unit 130 proceeds to (S305-6).

(S305-6) The owner information generation unit 130 determines whether the processing has been completed for all sets of the products and the actual operation time. When the processing has not been completed for all sets of the products and the actual operation time, the owner information generation unit 130 returns to (S305-1) and executes the same processing.

(S305-6) When the processing has been completed for all sets of the products and the actual operation time, the owner information generation unit 130 determines whether at least one entry is present in the list.

(S305-7) When at least one entry is present in the list, the owner information generation unit 130 determines that an entry requiring the update of the period is present. When the list is empty, the owner information generation unit 130 determines that no entry requiring the update of the period is present.

The above is the description of the processing in step S305.

When no entry requiring the update of the period is present, the owner information generation unit 130 proceeds to step S308.

When the entry requiring the update of the period is present, the owner information generation unit 130 updates the period of the entry (step S306). Thereafter, the owner information generation unit 130 proceeds to S307.

For example, the owner information generation unit 130 sets the actual operation time in the period 404 of the entry that is required to be updated. The owner information generation unit 130 may present a list to the user terminal 103 or the like and accept a user input.

Next, the owner information generation unit 130 updates the environment data owner information 142 based on the update result (step S307). Specifically, the following processing is executed.

(S307-1) The owner information generation unit 130 selects one entry from the list generated in step S305.

(S307-2) The owner information generation unit 130 searches for an entry included in the period included in the entry for which the value of the period 504 is selected with reference to the environment data owner information 142.

(S307-3) The owner information generation unit 130 updates the value of the period 504 of the searched entry based on the actual operation time included in the entry selected from the list. When a plurality of searched entries are present, the same processing is executed for each entry.

For example, the owner information generation unit 130 sets the actual operation time in the period 504. The owner information generation unit 130 may present an entry searched by the user terminal 103 or the like and accept the user input.

As in the first embodiment, the owner information generation unit 130 may set a prohibition period in a part of the operation time. For example, it is considered to set the prohibition period as 5 minutes before the end time of the actual operation time. In this case, the owner information generation unit 130 determines the period excluding the prohibition period from the operation time as the period of the catalog data 300.

(S307-4) The owner information generation unit 130 determines whether the processing has been completed for all the entries in the list. When the processing has not been completed for all the entries in the list, the owner information generation unit 130 returns to (S307-1) and executes the same processing. When the processing has been completed for all the entries in the list, the owner information generation unit 130 initializes the list, and then ends the processing in step S307.

The above is the description of the processing in step S307.

In step S308, the owner information generation unit 130 determines whether the processing has been completed for the catalog data 300 of all the operation data (step S308).

When the processing for the catalog data 300 of all the operation data has not been completed, the owner information generation unit 130 returns to step S301 and executes the same processing.

When the processing for the catalog data 300 of all the operation data has been completed, the owner information generation unit 130 ends the owner information update processing.

The access control for the collected data using the operation data owner information 141 and the environment data owner information 142 according to the second embodiment is the same as that according to the first embodiment.

According to the second embodiment, more appropriate access control for collection data can be achieved by updating owner information according to the actual operation result of the production system 101.

The invention is not limited to the above-mentioned embodiments, and includes various modifications. For example, the embodiments described above have been described in detail for easy understanding of the invention, and the invention is not necessarily limited to those including all the configurations described above. Apart of a configuration of each of the embodiments may be deleted, added and replaced with another configuration.

A part or all of the configurations, functions, processing units, processing methods, and the like described above may be implemented by hardware such as by a design using an integrated circuit. The invention can also be implemented by a program code of software that implements the functions according to the embodiment. In this case, a storage medium recording the program code is provided to a computer, and a processor included in the computer reads out the program code stored in the storage medium. In this case, the program code itself read out from the storage medium implements the functions according to the above-mentioned embodiment, and the program code itself and the storage medium storing the program code constitute the invention. The storage medium for supplying the program code includes, for example, a flexible disk, a CD-ROM, a DVD-ROM, a hard disk, a solid state drive (SSD), an optical disk, a magneto-optical disk, a CD-R, a magnetic tape, a nonvolatile memory card, and a ROM.

Further, the program code for achieving the functions according to the present embodiment can be implemented in a wide range of programs or script languages such as assembler, C/C++, perl, Shell, PHP, Python, and Java (registered trademark).

Further, the program code of the software that achieves the functions according to the embodiments may be stored in a storage unit such as a hard disk or a memory of a computer or a storage medium such as a CD-RW or a CD-R by being delivered via a network, and a processor included in the computer may read out and execute the program code stored in the storage unit or the storage medium.

In the embodiments described above, control lines and information lines are considered to be necessary for description, and all control lines and information lines are not necessarily shown in the product. All configurations may be connected to one another.

What is claimed is:

1. A computer system comprising:
at least one computer connected to a database that stores data acquired from a sensor installed in a production system in which a plurality of machines operate according to schedule information, wherein
in the production system, a plurality of products are produced,
the at least one computer includes a processor configured to generate information for controlling access to data stored in the database and search for data stored in the database,
the database stores operation data managed in association with identification information of the machines, and environment data which is data relating to an environment of the production system,
wherein the processor is configured to:
acquire the schedule information including a production schedule of the plurality of products,
generate, by analyzing the schedule information, first owner information for storing first access control data including identification information of the owner, identification information of the machines, and a first access period set based on operation time during which production operation of the products is performed in the machines,
generate, based on the first owner information, second owner information for storing second access control data including identification information of the owner included in the first access control data, a type of the environment data, and a second access period set based on the first access period included in the first access control data, and select a target machine among the plurality of machines, calculate, by analyzing the operation data of the target machine, a switching point indicating a time at which the product handled by the target machine is switched, calculate actual operation time of the plurality of products in the target machine based on the switching point, determine whether the first access period needs to be updated by comparing the first access period of the first access control data storing the identification information of the owner of the product with the actual operation time of the product, present a result of the determination, and control accesses to the operation data and the environment data based on the first owner information and the second owner information.

2. The computer system according to claim 1, wherein the processor is further configured to:

acquire, when receiving an access request from a first user to the database, the first access control data and the second access control data that include the identification information of the owner corresponding to the first user with reference to the first owner information and the second owner information, control access to the operation data stored in the database based on the acquired first user data, and control access to the environment data stored in the database based on the acquired second user data.

3. The computer system according to claim 1, wherein the computer system holds policy information for setting a prohibition period, which is a period of a time stamp that restricts access to the data stored in the database, and the processor is further configured to:

set the prohibition period for the first access period included in the specified first access control data based on the policy information, and set a period excluding the prohibition period from the first access period as the second access period.

4. The computer system according to claim 1, wherein the processor is further configured to:

specify the second access control data generated using the first access control data in which the first access period is updated, and update the second access period of the specified second access control data based on the updated first access period.

5. A data access control method in a computer system, wherein the computer system includes at least one computer connected to a database that stores data acquired from a sensor installed in a production system in which a plurality of machines operate according to schedule information, in the production system, a plurality of products are produced, the at least one computer includes a processor configured to generate information for controlling access to data stored in the database and search for data stored in the database, and the database stores operation data managed in association with identification information of the machines, and environment data which is data relating to an environment of the production system, the data access control method comprising the steps of:

acquiring, by the processor, the schedule information including a production schedule of the plurality of products;

generating, by the processor, by analyzing the schedule information, first owner information for storing first access control data including identification information of the owner, identification information of the machines, and a first access period set based on operation time during which production operation of the products is performed in the machines;

generating, by the processor, based on the first owner information, second owner information for storing second access control data including identification information of the owner included in the first access control data, a type of the environment data, and a second access period set based on the first access period included in the first access control data;

selecting, by the processor, a target machine among the plurality of machines;

calculating, by the processor, by analyzing the operation data of the target machine, a switching point indicating a time at which the product handled by the target machine is switched;

calculating, by the processor, actual operation time of the plurality of products in the target machine based on the switching point;

determining, by the processor, whether the first access period needs to be updated by comparing the first access period of the first access control data storing the identification information of the owner of the product with the actual operation time of the product;

presenting, by the processor, a result of the determination; and controlling, by the processor, accesses to the operation data and the environment data based on the first owner information and the second owner information.

6. The data access control method according to claim 5, wherein the step of controlling, by the processor, accesses to the operation data and the environment data based on the first owner information and the second owner information, further comprises the steps of:

acquiring, by the processor, when receiving an access request from a first user to the database, the first access control data and the second access control data that include the identification information of the owner corresponding to the first user with reference to the first owner information and the second owner information;

controlling, by the processor, access to the operation data stored in the database based on the acquired first user data; and controlling, by the processor, access to the environment data stored in the database based on the acquired second user data.

7. The data access control method according to claim 5, wherein the computer system holds policy information for setting a prohibition period, which is a period of a time stamp that restricts access to the data stored in the database, and the data access control method further comprises the steps of:

setting, by the processor, the prohibition period for the first access period included in the specified first access control data based on the policy information; and setting, by the processor, a period excluding the prohibition period from the first access period as the second access period.

8. The data access control method according to claim 5, further comprising the steps of:

specifying, by the processor, the second access control data generated using the first access control data in which the first access period is updated; and updating, by the processor, the second access period of the specified second access control data based on the updated first access period.

* * * * *